United States Patent [19]

Tsukai

[11] Patent Number: 4,636,628
[45] Date of Patent: Jan. 13, 1987

[54] OPTICALLY RECORDED DATA READING APPARATUS WITH INCLINATION CONTROLLER

[75] Inventor: Yoshiyuki Tsukai, Saitama, Japan

[73] Assignee: Pioneer Electronic Corporation, Tokyo, Japan

[21] Appl. No.: 694,195

[22] Filed: Jan. 23, 1985

[30] Foreign Application Priority Data

Jan. 23, 1984 [JP] Japan .................. 59-7434[U]

[51] Int. Cl.$^4$ ............................ G01J 1/20; G11B 5/09
[52] U.S. Cl. ........................................ 250/201; 369/46
[58] Field of Search ............... 250/201, 204, 216, 237, 250/570, 578, 222.1, 224, 548, 557, 561; 369/44–46

[56] References Cited

U.S. PATENT DOCUMENTS

| | | | |
|---|---|---|---|
| 4,502,134 | 2/1985 | Kondo et al. | 369/46 |
| 4,547,663 | 10/1985 | Kitagishi et al. | 250/204 X |
| 4,589,103 | 5/1986 | Tajima | 369/46 |

OTHER PUBLICATIONS

*IBM Technical Disclosure Bulletin* "Field Disturbance Sensing Unit"; vol. 18, No. 7, Dec. 1975, pp. 2275–2276.

*Primary Examiner*—Eugene R. LaRoche
*Assistant Examiner*—David Mis
*Attorney, Agent, or Firm*—Sughrue, Mion, Zinn, Macpeak and Seas

[57] ABSTRACT

An apparatus for reading optically recorded data from a disk in which diffracted light beams, which otherwise would be applied to light-detecting elements and which are of higher order than the positive and negative first-order diffracted light beams, are eliminated and only a zeroth-order diffracted light beam is applied to the light-detecting elements. Thereby, a tilt control signal is produced whereby a tilt servo operation can be carried out with a high accuracy. Several different structural arrangements are disclosed for achieving the desired blocking of the higher-than-zeroth-order diffracted light beams.

8 Claims, 19 Drawing Figures

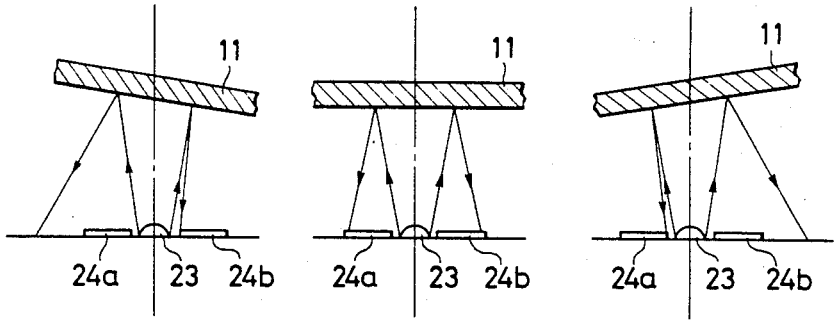
FIG. 4A PRIOR ART  FIG. 4B PRIOR ART  FIG. 4C PRIOR ART
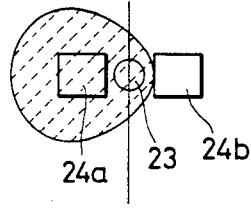 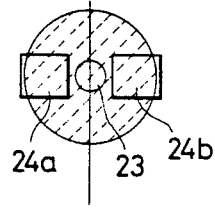 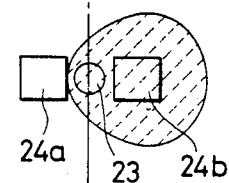
FIG. 5A PRIOR ART  FIG. 5B PRIOR ART  FIG. 5C PRIOR ART
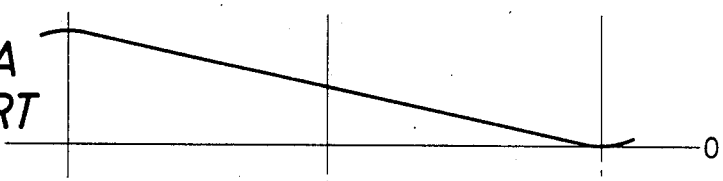
FIG. 6A PRIOR ART
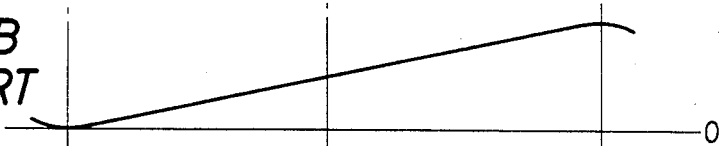
FIG. 6B PRIOR ART
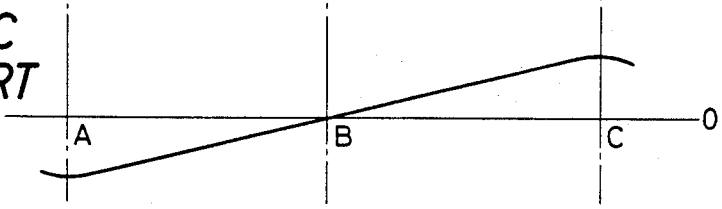
FIG. 6C PRIOR ART

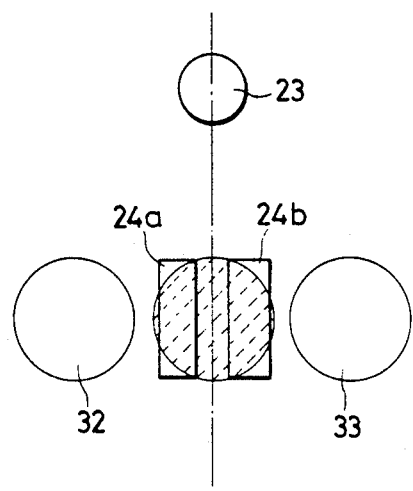
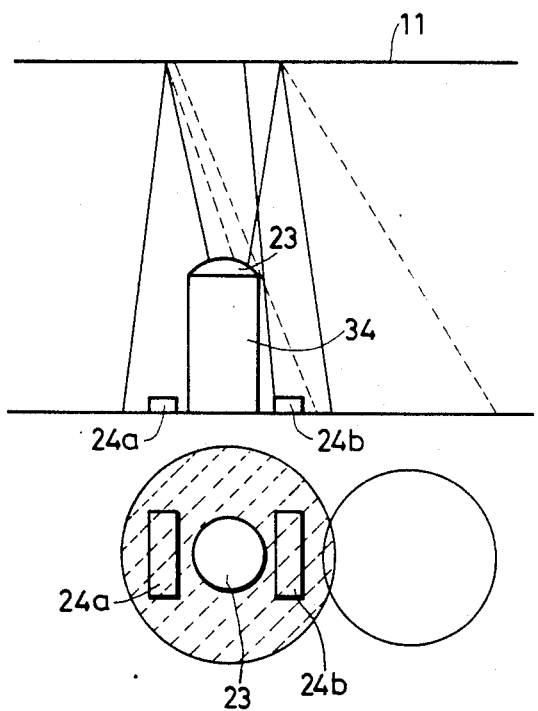
FIG. 11
FIG. 12
FIG. 13

OPTICALLY RECORDED DATA READING APPARATUS WITH INCLINATION CONTROLLER

BACKGROUND OF THE INVENTION

The present invention relates to an apparatus for reading optically recorded data, and more particularly, to an apparatus for reading optically recorded data having a servo system adapted to maintain the optical axis of a recorded data reading light beam perpendicular to the recording surface of a recording medium.

If the angle between the optical axis of a recorded data reading light beam and a recording medium (recording disk) deviates significantly from 90°, "leakage" of data from adjacent recording tracks occurs that is, cross talk occurs.

A variety of factors can cause the abovedescribed angular deviation. For instance, such deviation may be caused if the recording disk becomes warped or if the disk rotating shaft is bent. These types of difficulties occur after shipment of the product, and therefore the occurrence thereof is unavoidable.

Accordingly, it is necessary to provide a servo system which electrically detects the presence of cross talk and in response maintains the optical axis of the recorded data reading light beam perpendicular to the recording disk, thereby to minimize the amount of cross talk. Such a technique is disclosed by Japanese Laid-Open Patent Application No. 186237/1982. The technique disclosed by this Japanese Patent Application is applied to a reproducing device for a recording disk on which data is recorded according to a CLV (constant linear velocity) system. More specifically, cross talk is detected utilizing the fact that, in a recording track produced using the CAV (constant angular velocity) system, the synchronizing signal recording intervals are aligned on the same radial line throughout the recording tracks. This is not true, however, for a recording track produced using the CLV system. For the CAV system, the leakage of synchronizing signal data from adjacent tracks is detected thereby to detect the amount of cross talk, and the optical axis of the data reading light beam is controlled so as to eliminate the cross talk thus detected.

The above-described technique is disadvantageous in that the electrical circuit needed for detecting the cross talk is complex and expensive, and the technique is applicable only to recording disks produced using the CLV system, not those produced using the CAV system.

In accordance with another technique, as disclosed by Japanese Laid-Open Patent Application No. 179954/1982 and as outlined in FIG. 1 herein, an objective lens 3 is provided to focus a recorded data reading light beam with an optical axis 1 on the recording surface 2 of a recording disk. A light source 4 for emitting a detecting auxiliary beam is provided to permit detection of the amount of deviation of the angle between the optical axis 1 and the recording surface from 90°. The auxiliary beam is applied through the objective lens 3 to the recording surface 2, and the light reflected therefrom is applied through the objective lens 3 to a pair of light-detecting elements 5 and 6. When the recording surface 2 is perpendicular to the optical axis 1, the auxiliary beam is reflected symmetrically with respect to the optical axis and is thus returned symmetrically with respect to the optical axis, as indicated by a solid line in FIG. 1. On the other hand, if the recording surface is inclined, as indicated by the dot/dash line or the broken line, extending through the recording surface 2, then the auxiliary beam will be reflected as indicated by the dot/dash line or the broken line extending through the objective lens 3.

The light-detecting elements 5 and 6 are provided for these reflected beams, as shown in FIG. 1. The outputs of the light-detecting elements 5 and 6 are applied to respective inputs of a differential amplifier 7, which provides a detection output. The detection output is supplied to a subtractor 8 where the detection output and a reference signal 9 are subjected to subtraction to provide a subtraction output. The subtraction output is applied to an optical axis inclination control mechanism 10 to cause the optical axis to form a 90° angle with respect to the recording surface.

In the above-described technique, the auxiliary beam, which is a parallel beam, is applied through the objective lens to the recording surface. Due to this fact, the technique suffers from the following difficulties: Unless the focus servo system operates very stably, the servo system used for making the optical axis 1 of the recording surface (hereinafter referred to as "a tilt servo system" when applicable) cannot operate properly. Therefore, the tilt servo operations cannot be effected before the focus servo is locked in. At the worst, neither the tilt servo operation nor the focus servo can be effected. In other words, in order for the auxiliary beam emitted parallel to the optical axis 1 to be reflected to the correct positions on the light-detecting elements 5 and 6, the disk surface must coincide with the focal point of the lens. If the disk surface is not at the focal point of the lens, the positions on the light-detecting elements to which the reflected auxiliary beam is applied are unsuitable, being shifted to the right or left in FIG. 1. Therefore, the differential amplifier 7 provides an erroneous output so that the angle of the optical axis 1 is set incorrectly.

If the angle of the optical axis deviates too much from 90°, the position of a data detection beam reflected to a detector (not shown) adapted to supply a control signal to the focus servo system or the tracking servo system is changed, and therefore unwanted DC components are superposed on an error signal used for locking in the servo system.

Moreover, since the pickup is miniaturized, it is difficult to arrange the optical system of the tilt servo system in the pickup. That is, since the auxiliary beam is applied to the objective lens provided for the recorded data reading light beam, the angle of field of the lens for the recorded data reading light beam is small, which limits the design of the optical system.

In order to eliminate the above-described difficulties, a device as shown in FIGS. 2 and 3 has been proposed by the present applicant and disclosed in Japanese Utility Model Application No. 63397/1983. In FIG. 2, a disk 11 is inclined with respect to the horizontal line due, for instance, to warping of the disk. An optical head unit 12 for optically reading data on the recording disk is provided. The optical head unit 12 is rockably mounted on a shaft 14 supported by supporting members 13. The supporting members 13 are fixedly secured to a slider 15 which is adapted to move the head unit 12 radially of the disk 11. A part of the slider 15 is formed into a rack 16 engaged with a pinion gear 17. The pinion gear 17 is rotated by a slider motor 18 so that the slider 15 is moved radially of the disk.

Furthermore, an ordinary control-signal generating section 20 and a high-speed control-signal generating section 21 are provided. The ordinary control signal generating section 20 detects the DC component included in an error signal outputted by a tracking error signal generator (not shown) to provide a signal for controlling the movement of the slider. The high-seed control-signal generating section 21 produces a high-speed control signal during recorded data address retrieval, that is, during scanning operations. The outputs of these two signal generating sections are applied to an adder 22, and the output of the adder 22 is applied to a driver circuit 19 to operate the slider motor 18.

In order to detect the inclination of the disk 11, a light-emitting element 23 and light-detecting elements 24a and 24b are provided on the head unit 12. The outputs of the light-detecting elements 24a and 24b are applied to a differential amplifier 25, the difference output of which is applied to a driver circuit 26 to operate a tilt motor 27. A male-threaded part 28 coupled to the rotary shaft of the tilt motor 27 is engaged with a female-threaded part provided in a part of the optical head unit 12 in such a manner that the latter is inclined with rotation of the tilt motor 27. In this operation, the optical head unit 12 is rocked about the abovedescribed shaft 14 supported by the supporting members 13. A spring S placed around the male-threaded part 18 is provided to prevent backlash.

FIG. 3 is a perspective view of the optical head unit 12. In FIG. 3, reference numeral 29 designates an objective lens. A recorded data reading light beam emitted from a laser source built into the unit 12 is focused on the recording surface of the recording disk 11 by the objective lens 29. The center of the objective lens 29 is set at the intersection of the optical axis 31 of the light beam and the shaft 14. A focus actuator 30 includes a magnetic circuit, coils, etc.

A straight line that connects the center of the objective lens 29 and the center of the light-emitting element 23 is substantially parallel to the tangent of a recording track which is being reproduced. The light-emitting element 23 is preferably set ahead of the data detecting point where the light beam is focused in the recorded data reading operation so that light emitted from the light-emitting element and its reflected light will not pass through the objective lens 29.

The optical axis 31 of the recorded data reading light beam is parallel to the optical axis of the light beam from the light-emitting element 23. Even if the former optical axis is in alignment with the latter optical axis, no problem will be caused.

The operation of the device thus designed will be described with reference to FIGS. 4A through 6C. FIGS. 4A through 4C show reflection states of a light beam from the light-emitting element 3 for different inclination angles of the disk, FIGS. 5A through 5C show the different reflection states as viewed from the side of the disk, and FIGS. 6A through 6C indicate the outputs a and b of the light-detecting elements 24a and 24b, and the output c of the differential amplifier 25. More specifically, FIGS. 6A through 6C indicate the output a of the light-detecting element 24a, the output b of the light-detecting element 24b, and the output c of the differential amplifier 25. The points A, B and C in FIGS. 6A through 6C correspond to the states shown in FIGS. 4A and 5A, 4B and 5B, and 4C and 5C, respectively. The point B corresponds to the case where the disk is oriented horizontally, perpendicular to the optical axis 31.

In the case where the disk is perpendicular to the optical axis 31, the light beam from the light-emitting element 23 is reflected by the recording surface of the disk 11 while diverging, and the light beam thus reflected is applied uniformly to the light-detecting elements 24a and 24b. Therefore, the outputs of the two elements 24a and 24b are equal in magnitude, and hence the output level of the differential amplifier 25 is zero.

On the other hand, if the disk 11 is warped as shown in FIG. 6A or 6B, the disk 11 is no longer perpendicular to the optical axis 31. In the case of FIG. 4A, the reflected light is applied only to the light-detecting element 24a, and therefore the output level of the light of the light-detecting element 24b is substantially zero, as a result of which the output level of the differential amplifier 25 is maximum with a positive polarity. Similarly, in the case of FIG. 4C, the reflected light is applied only to the light-detecting element 24b, and therefore the output level of the differential amplifier 25 is maximum with a negative polarity.

Accordingly, the output c of the differential amplifier 25 is a signal having a level and polarity which change with the deviation of the angle between the disk 11 and the optical axis and the direction of the deviation. Therefore, if a closed-loop tilt servo operation is carried out so that the differential output c is zeroed, the optical axis 31 of the light beam can be maintained perpendicular to the disk 11 at all times and thus cross talk can be eliminated. If the light from the light-emitting element 23 has an intensity distribution such as a Gaussian distribution, the slope of the output characteristic of the differential amplifier is large and the detection sensitivity is high, as a result of which the size and arrangement of the light-detecting elements 24a and 24b can be determined readily.

The differential output of the differential amplifier 25 drives the tilt motor 27 in such a manner that the optical head unit 12 is rocked about the shaft 14. Tilt servo operation is carried out in this manner.

However, in the above-described device, the diffraction of the light beam reflected from the recording disk is not taken into considertation. In actuality, it has been found that the diffracted light is affected in configuration, position and intensity by the pit configuration and the track pitch of the disk. As a result, data other than the tilt data tends to be mixed into the tilt signal, that is the tilt signal may become erroneous.

FIG. 7 is a plan view showing the light source 23 and the light-detecting elements 24a and 24b arranged without taking the effect of the primary diffracted light into consideration. In FIG. 7, reference numerals 32 and 33 designate the primary diffracted light beams. In this case, the recording track extends in the direction indicated by the dot/dash line in FIG. 7. In an actual recording disk, the pits are arranged two-dimensionally, and therefore the light is diffracted in the vertical direction in FIG. 7. However, in that direction, the pits are arranged irregularly due to the signal information they convey, and the effects thereof can be substantially disregarded. On the other hand, the track pitch is relatively high in regularity, and therefore, with respect to the light beams diffracted perpendicularly to the track, the effect of the track pitch cannot be disregarded. The track, being spiral, has a certain curvature. Therefore, in practice, the right and left first-order diffracted light beams are asymmetrical to a degree determined by this curvature (in FIG. 7, the diffracted light beams are shown as being symmetrically for convenience in illustration), and their configurations are affected by the distance between the disk and the light-detecting elements 24a and 24b.

When the above described positive and negative first-order diffracted light beams 32 and 33 are applied to the light-detecting elements 24a and 24b, due to differences in disk conditions such as different track curvatures of the inner and outer peripheries of the disk and variations in intensity of the positive and negative first-order diffracted light beams due to the asymmetric configuration of the pits, data other than the data of inclination of the disk, namely, noise signals, are mixed in so that the tilt signal becomes erroneous, thus making it difficult to perform the tilt servo operation with a high accuracy.

SUMMARY OF THE INVENTION

Accordingly, an object of the invention is to provide an optical recorded data reading apparatus in which diffracted light beams, which otherwise may be applied to light-detecting elements and which are of higher order than the positive and negative first-order diffracted light beams, are eliminated so that only a zeroth-order diffracted light beam is applied to the light-detecting elements to obtain a tilt signal, whereby a tilt servo operation is carried out with high accuracy.

Provided according to the invention is an optical recorded data reading apparatus which has a servo system for maintaining the optical axis of a recorded data reading light beam perpendicular to the recording surface of a recording medium by inclination controlling means for detecting a deviation of the angle between the optical axis and the recording surface 90° and controlling the angle of the optical axis according to the deviation thus detected, in which, according to the invention, the inclination controlling means comprises: light-emitting means for emitting a light beam towards the recording surface; and light-detecting means receiving the light beam reflected from the recording surface, the light-emitting means and the light-detecting means being positioned so that, of the diffracted light beams reflected from the recording surface, substantially only the zeroth-order diffracted light beam is applied to the light-detecting means.

Preferably, in the apparatus, the light-emitting means and the light-detecting means are positioned so that the emitted light beam and the reflected light beam do not pass through a focusing lens provided for the recorded data reading light beam.

BRIEF DESCRIPTION OF THE DRAWINGS

FIGS. 4A through 6C are diagrams used for a description of the detection principle of a tilt detecting section in the system shown in FIG. 2;

FIGS. 8 through 13 are diagrams used for a description of a variety of embodiments of the invention.

DESCRIPTION OF THE PREFERRED EMBODIMENTS

Preferred embodiments of the invention will be described with reference to the drawings.

Figure 1:
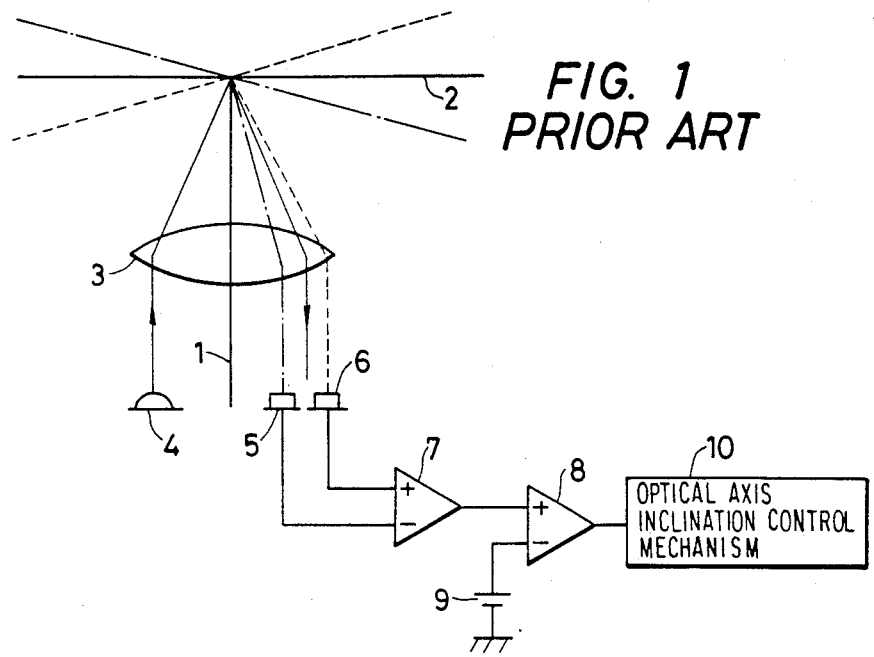
FIG. 1 is a diagram outlining a conventional tilt detecting device.
Figure 2:
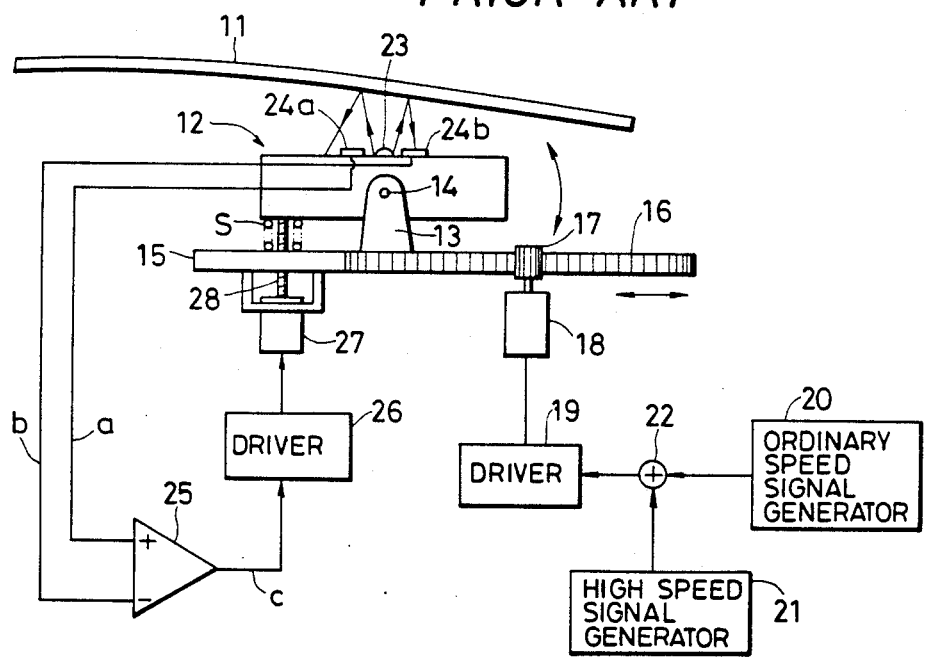
FIG. 2 is a diagram outlining a tilt servo system which has been proposed by the present applicant.
Figure 3:
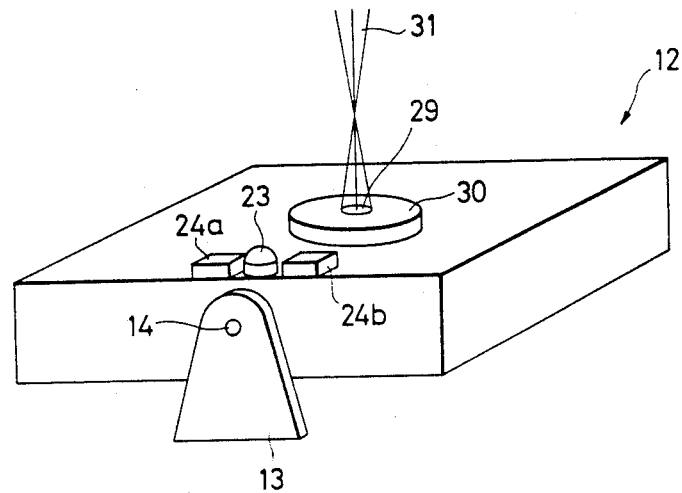
FIG. 3 is a perspective view showing an optical head unit in the system shown in FIG. 2.
Figure 7:
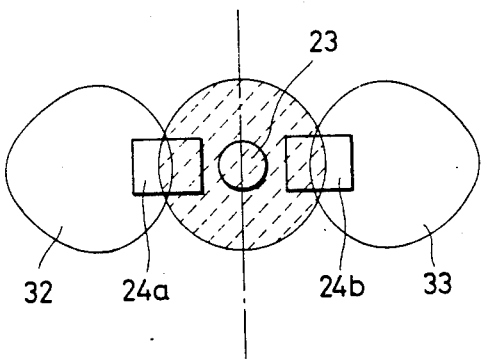
FIG. 7 is a diagram used for a description of the effects of the first-order diffracted light in the system shown in FIG. 2.
Figure 8:
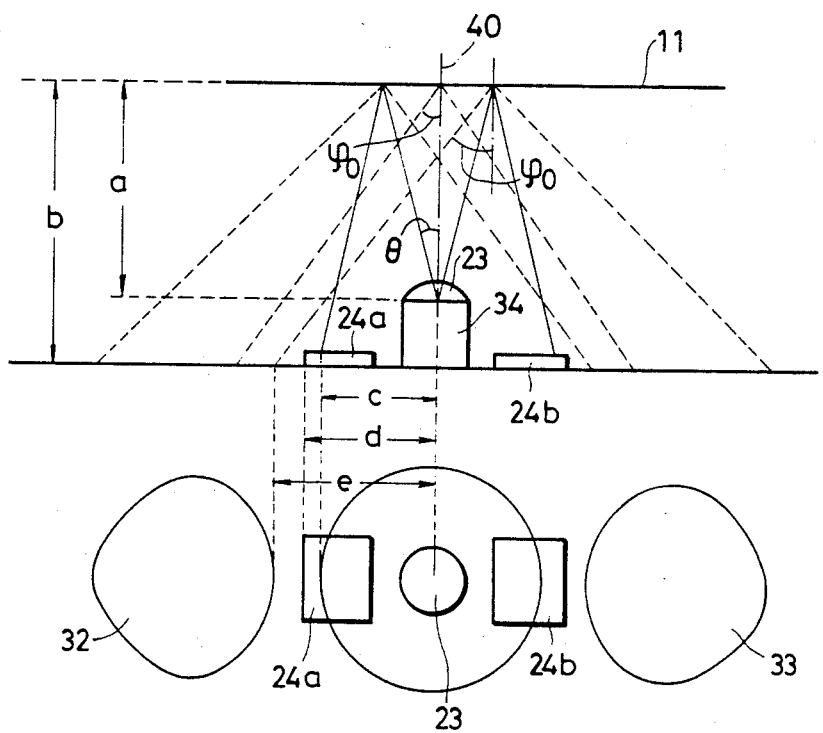

FIG. 8 is a diagram for a description of a first embodiment of the invention. In FIG. 8, those components which have been previously described with reference to FIGS. 1 through 7 are designated by the same reference numerals or characters. The light-emitting element 23 is mounted on a stand 34 having a predetermined height. As shown in FIG. 8, the distance between the light source 23 and the disk 11 is represented by a, the distance between the disk 11 and the light-detecting elements 24a and 24b is represented by b, the maximum divergent angle of the light source (with respect to an optical axis 40) is represented by $\theta$, the radius of the zeroth-order diffracted light beam is represented by c, the distance between the optical axis 31 and the outermost periphery of each light-detecting element is represented by d, and the distance between the optical axis 31 and the innermost periphery of each first-order diffracted light beam by e. Furthermore, the angle of diffraction of a light beam applied perpendicularly to the disk is represented by $\psi_0$, the angle of diffraction of the maximum divergent angle $\theta$ is represented by $\psi_\theta$, and the wavelength of the light source is represented by $\lambda$. The angles of diffraction $\psi_0$ and $\psi_\theta$ can be expressed as follows:

$$\psi_0 = \sin^{-1}(\lambda/t), \text{ and}$$

$$\psi_\theta = \sin^{-1}(\lambda/t - \sin\theta),$$

where t is the track pitch.

Fundamentally, the effect of the first order diffracted light beam on the light-detecting elements 24a and 24b can be prevented by making e larger than d. Therefore, the positional relationship between the light-detecting elements and the light-emitting element can be determined by utilizing the above-described expressions and the condition d<e. On the other hand, the positional relationship is determined by taking the maximum inclination of the disk 11, etc., into account. However, it is allowable for some portion of the first-order diffracted light beam to reach the light-detecting elements.

Figure 9:
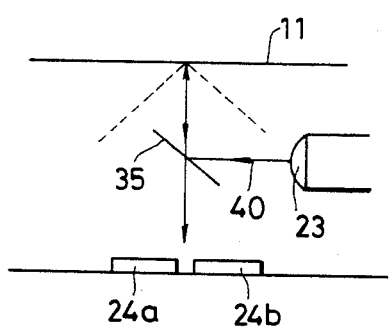

FIG. 9 is a diagram showing a second embodiment of the invention. In the second embodiment, a half-silvered mirror 35 is employed so that only light reflected perpendicularly from the disk 11 is applied to the light-detecting elements 24a and 24b. Therefore, the emergent optical axis 40 of the light source 23 is set parallel to the disk 11, and the half-silvered mirror 35 forms an angle of 45° with the optical axis 40. The diffracted light beams whose orders are higher than the positive and negative first-order diffracted light beams are not applied to the light-detecting elements, diverging as indicated by the dotted lie.

Figure 10:
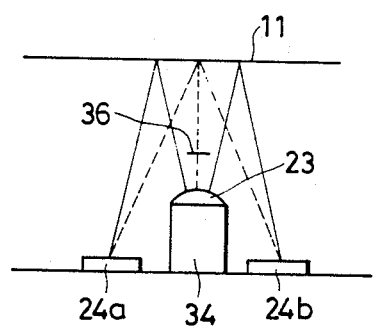

FIG. 10 is a diagram showing a third embodiment of the invention. In the third embodiment, in the case where employment of the method described with reference to FIG. 8 dimensionally limits the positional relationship between the light-emitting element and the light-detecting elements so that it is difficult to sufficiently prevent the application of the positive and negative first-order diffracted light beams to the light-detecting elements, a light-absorbing member 36 provided immediately above the light-emitting element 23 is shifted towards the light source in correspondence with the angles of the positive and negative first-order diffracted light beams which cover the light-detecting elements so as to prevent the application of the positive and negative first-order diffracted light beams.

FIG. 11 is a diagram showing a fourth embodiment of the invention. In the fourth embodiment, the light-emitting element 23 is spaced a predetermined distance in the track direction (indicated by a dot/dash line) from the light-detecting elements 24a and 24b. The optical axis 31 of the data reading beam (FIG. 3), not being parallel to the optical axis of the light-emitting element, intersects the disk 11 near the data detecting point thereon. Accordingly, the two light-detecting elements 24a and 24b can be arranged in close contact. In this case, the loss of the quantity of light received is minimized, and reception of the positive and negative first-order diffracted light beams 32 and 33 readily prevented.

FIG. 12 is a diagram showing a fifth embodiment of the invention. In this embodiment, a prism 37, having a configuration in section as shown in the figure, is provided immediately above the light source 23 to split the light beam from the light source into two parts, thereby to more effectively avoid reception of the positive and negative first-order diffracted light beams.

FIG. 13 is a diagram showing a sixth embodiment of the invention. In the sixth embodiment, the height of the stand 34 on which the light source 23 is provided is increased so that the shadow formed by the stand and the light source prevents application of the higher-order diffracted light beams to the light-detecting elements 24a and 24b. FIG. 13 shows the zeroth-order diffracted light beam (indicated by solid lines) and the first order diffracted light beam on one side (indicated by broken lines) which are intercepted by the light source.

As is apparent from the above description, according to the invention, the positional relationship between the light source and the light-detecting elements is set in the range in which the light-detecting elements are not affected by the first-order diffracted light beam. Thus, the tilt signal is obtained only from the zeroth-order diffracted light beam. Therefore, even when the constants of the disk change, the tilt signal obtained is correct at all times.

Furthermore, as the tilt detection signal generating light beam does not pass through the objective lens, the tilt servo operation can be performed before the focus servo is locked in, and the tilt servo operation is not adversely affected by movement of the objective lens in the tracking operation. In addition, as the light-emitting element and the light-detecting elements used for tilt detection are mounted on the outer peripheral wall of the optical head unit, it is unnecessary to provide these elements inside the unit as in the example shown in FIG. 1, which contributes to miniaturization of the optical head unit.

I claim:

1. In an optical recorded data reading apparatus having a servo system for maintaining the optical axis of a recorded data reading light beam perpendicular to the recording surface of a recording medium, said servo system including inclination controlling means for detecting a deviation of an angle between said optical axis and said recording surface from 90° to control said angle according to the deviation thus detected, the improvement wherein said inclination controlling means comprises: light-emitting means for emitting a light beam towards said recording surface; and light-detecting means receiving said light beam reflected from said recording surface, said light-emitting means and said light-detecting means being positioned so that, of diffracted light beams reflected from said recording surface, substantially only a zeroeth-order diffracted light beam is applied to said light-detecting means.

2. The apparatus as claimed in claim 1, wherein said light-emitting means and said light-detecting means are positioned so that said emitted light beam and said reflected light beam do not pass through a focusing lens provided for said recorded data reading light beam.

3. The apparatus as claimed in claim 1, wherein said light-detecting means comprises first and second light detectors spaced apart from one another.

4. The apparatus as claimed in claim 3, wherein an optical axis of said beam emitted by said light-emitting means is substantially parallel to said recording surface, and further comprising a half-silvered mirror disposed so as to reflect said beam emitted by said light-emitting means towards said recording surface and pass a reflected beam towards said first and second light detectors, said first and second light detectors having lcmght-sensing surfaces lying in a plane substantially parallel to said recording surface.

5. The apparatus as claimed in claim 3, wherein said light beam emitted by said light-emitting means is substantially perpendicular to said recording surface, wherein said first and second light detectors are disposed on opposite sides of said light-emitting means, and further comprising a light-absorbing member disposed between said light-emitting means and said recording surface disposed at a position so as to block all but said zeroeth-order light beam from reaching said first and second light detectors.

6. The apparatus as claimed in claim 3, wherein said light beam emitted by said light-emitting means is substantially perpendicular to said recording surface, wherein said first and second light detectors are disposed on opposite sides of said light-emitting means, and further comprising a prism disposed between said light-emitting means and said recording surface and disposed at a position so as to block all but said zeroeth-order light beam from reaching said first and second light detectors.

7. The apparatus as claimed in claim 3, wherein said first and second light detectors are disposed on opposite sides of said light-emitting means, and wherein the height of said light-emitting means above the respective light-sensitive surfaces of said first and second light detectors is sufficient to block all but said zeroeth-order light beam reflected from said recording surface from reaching said first and second light detectors.

8. The apparatus as claimed in claim 3, wherein said light-emitting means is offset in a track direction of said recording medium from a line joining centers of said first and second light detecting elements.

* * * * *